US008615072B2

(12) United States Patent
Mahalingam

(10) Patent No.: US 8,615,072 B2
(45) Date of Patent: Dec. 24, 2013

(54) SYSTEM AND METHODS FOR ESTABLISHING A TELEPHONY SESSION FROM A REMOTE DIALING UNIT

(76) Inventor: Padmanabhan Mahalingam, Madras (IN)

( * ) Notice: Subject to any disclaimer, the term of this patent is extended or adjusted under 35 U.S.C. 154(b) by 0 days.

(21) Appl. No.: 13/443,271

(22) Filed: Apr. 10, 2012

(65) Prior Publication Data
US 2012/0195420 A1    Aug. 2, 2012

Related U.S. Application Data

(63) Continuation of application No. 12/105,532, filed on Apr. 18, 2008, now abandoned.

(60) Provisional application No. 60/914,508, filed on Apr. 27, 2007.

(51) Int. Cl.
*H04M 11/00* (2006.01)

(52) U.S. Cl.
USPC ............... 379/93.01; 379/216.01; 379/74; 379/102.01; 455/458; 455/436; 455/418; 455/439

(58) Field of Classification Search
USPC ............ 379/93.01; 455/458, 436, 414.1, 418, 455/439
See application file for complete search history.

(56) References Cited

U.S. PATENT DOCUMENTS

| | | | |
|---|---|---|---|
| 2006/0183478 A1* | 8/2006 | Jagadeesan et al. | 455/436 |
| 2007/0049298 A1* | 3/2007 | Jhuang | 455/458 |
| 2008/0175358 A1* | 7/2008 | Huang | 379/93.01 |

* cited by examiner

*Primary Examiner* — Joseph J Nguyen
(74) *Attorney, Agent, or Firm* — Donald R. Boys; Central Coast Patent Agency, Inc.

(57) ABSTRACT

A user-operated system for causing a land-line telephone to dial a destination includes a mobile telephony device having a speaker and an internal dual tone multiple frequency (DTMF) dialer, and a dialer extension integrated with a microphone on the land line telephone for capturing a DTMF telephone number sequence. A telephone number is selected on the mobile telephony device, which generates an audible DTMF for the telephone number over the speaker, and the DTMF is captured by the microphone, and the land-line telephone dials the destination.

8 Claims, 6 Drawing Sheets

SYSTEM AND METHODS FOR ESTABLISHING A TELEPHONY SESSION FROM A REMOTE DIALING UNIT

CROSS-REFERENCE TO RELATED APPLICATIONS

The present invention is a continuation of pending case Ser. No. 12/105,532 filed Apr. 18, 2008, which claimed priority to a U.S. provisional patent application Ser. No. 60/914,508, filed Apr. 27, 2007, entitled "Method and Apparatus for Transferring a Number Dialing Operation to a Second Telephone Unit from a Mobile Dialer". Priority is claimed for provisional application 60/914,508, and all common disclosure is incorporated herein in its entirety at least by reference.

BACKGROUND OF THE INVENTION

1. Field of the Invention

The present invention is in the field of telephony and pertains particularly to a system and methods for establishing a telephone session using remotely received commands from a dialing unit.

2. Discussion of the State of the Art

In the field of telephony, more particularly telephone equipment, the mobile or cellular telephone has gained wide acceptance in the market, mainly because of convenience. Most people now own a mobile telephone and subscribe to mobile telephone services in place of or in addition to a landline telephone service subscription. Demographics may vary somewhat regionally, however families often have several mobile units, subscribe to a mobile service while retaining their landline service as well.

The benefits of using a mobile telephone are well known. Some benefits of going mobile include security for family members including children, and having, hopefully, a reliable connection to friends, business associates, and family regardless of location. The mobile telephone is also convenient in that it generally includes an address book or phonebook where numbers can be pre-entered for easy dialing by highlighting an entry in the book and hitting the "dial", "call", or "talk" button on the phone, or, in some cases, by speaking a code name or alias.

One lingering problem with many wireless cellular and digital network services is that service is not always available in terms of suitable signal strength in some locations, such as at the edge of and between service cells or sectors. Due to the nature of wireless signal propagation between towers, satellites and relay points, some geographic features on the ground like mountains, tall buildings, tunnels, and low-lying depressions may serve as significant obstacles to obtaining a suitable signal for connecting to services, even when signal strength is generally good in the overall region. Low or no-service areas are often termed dead spots in the art. Moreover, in satellite-assisted digital networks, bad or stormy weather might also play a significant role in inhibiting signal strength in certain service areas, at least temporarily.

Landline services generally are more reliable than mobile services, because they use dedicated landlines to propagate the signal. It has occurred to the inventor that a mobile telephone having an address or phonebook may dial a number, producing thereby a clearly audible Dual Tone Multiple Frequency (DTMF) dial sequence regardless of the level of signal strength that might be available at the time of the call. Also, the process of dialing an address book entry is more convenient than it is in most landline telephone handsets. Many landline telephone handsets have programmable speed dialing options, but the number of entries that can be pre-programmed is generally limited. Unless those speed-dial numbers are visibly associated with a name on a handset insert card, many times the number/name association if forgotten by the user. On the other hand an address book always has a readily visible association between the name and number of an entry.

What is clearly needed are a system and methods for establishing a telephony session by transferring dialing intelligence executed from a mobile dialing unit to a second dialing unit, which actually dials the number based on a received command. This capability would increase the reliability of existing mobile telephone services by virtue of leveraging more reliable units at the time of the call attempt to actually place calls.

SUMMARY OF THE INVENTION

A problem stated above is that good signal strength and quality of connection is desirable for telephony communications but too often wireless telephony signals are not very reliable when compared to landline services. Drop-out and other quality of service and connection issues may cause problems for a mobile device attempting to establish a communication session with a destination or end device.

The inventor therefore considered functional elements of a telephony network and devices looking for elements that could be manipulated to provide a convenient way initiate communications from a device that is functioning poorly on the network because of one or more network-related issues.

Every telephone session established over a telephone network depends on the reliability of the carrier network to enable clear communication in a way that does not present problems. The inventor realized in an inventive moment that if, at the point of initiation of a communication, a telephony device experiencing connection or quality of service problems could transfer dialing responsibility and session establishment function to another telephony device not experiencing any service or network related issues, successful session establishment and clear communication would result.

Therefore the inventor constructed a unique telephony system that allowed successful communications sessions between parties to occur without the typical work of manually entering and dialing a telephone number from the unit that will dial the call. Significant workflow reduction is achieved relative to manual number entry and dialing tasks typically carried out on telephones to establish connectivity to a destination party.

Accordingly, in an embodiment of the invention, a user-operated system for causing a land-line telephone to dial a destination is provided, comprising a mobile telephony device having a speaker and an internal dual tone multiple frequency (DTMF) dialer, and a dialer extension integrated with a microphone on the land line telephone for capturing a DTMF telephone number sequence. A telephone number is selected on the mobile telephony device, which generates an audible DTMF for the telephone number over the speaker, and the DTMF is captured by the microphone, and the landline telephone dials the destination.

In one embodiment the telephone number is selected from a contact list stored on the mobile device, and in another embodiment the telephone number is entered by a user on a keypad of the mobile device.

In another aspect of the invention a method for dialing a destination on a land-line telephone is provided, comprising the steps (a) selecting a telephone number to dial from a the mobile device; (b) generating a dual tone multi frequency (DTMF) dialing sequence for the telephone number; (c) playing the DTMF sequence over a speaker system of the mobile device; (d) receiving the DTMF sequence at a microphone of the telephone; and (e) dialing the destination by the land-line telephone.

In one embodiment of the method the telephone number is selected from a contact list stored on the mobile device, and in another embodiment the telephone number is entered by a user on a keypad of the mobile device.

BRIEF DESCRIPTION OF THE DRAWING FIGURES

DETAILED DESCRIPTION

The inventor provides a system and methods for transferring telephony dialing instruction from one telephony device to another so that the second or receiving telephony device can execute a call to a destination device based on the instruction and intelligence received from the first or initiating device. The system and methods are detailed below in various illustrated embodiments.

Figure 1:
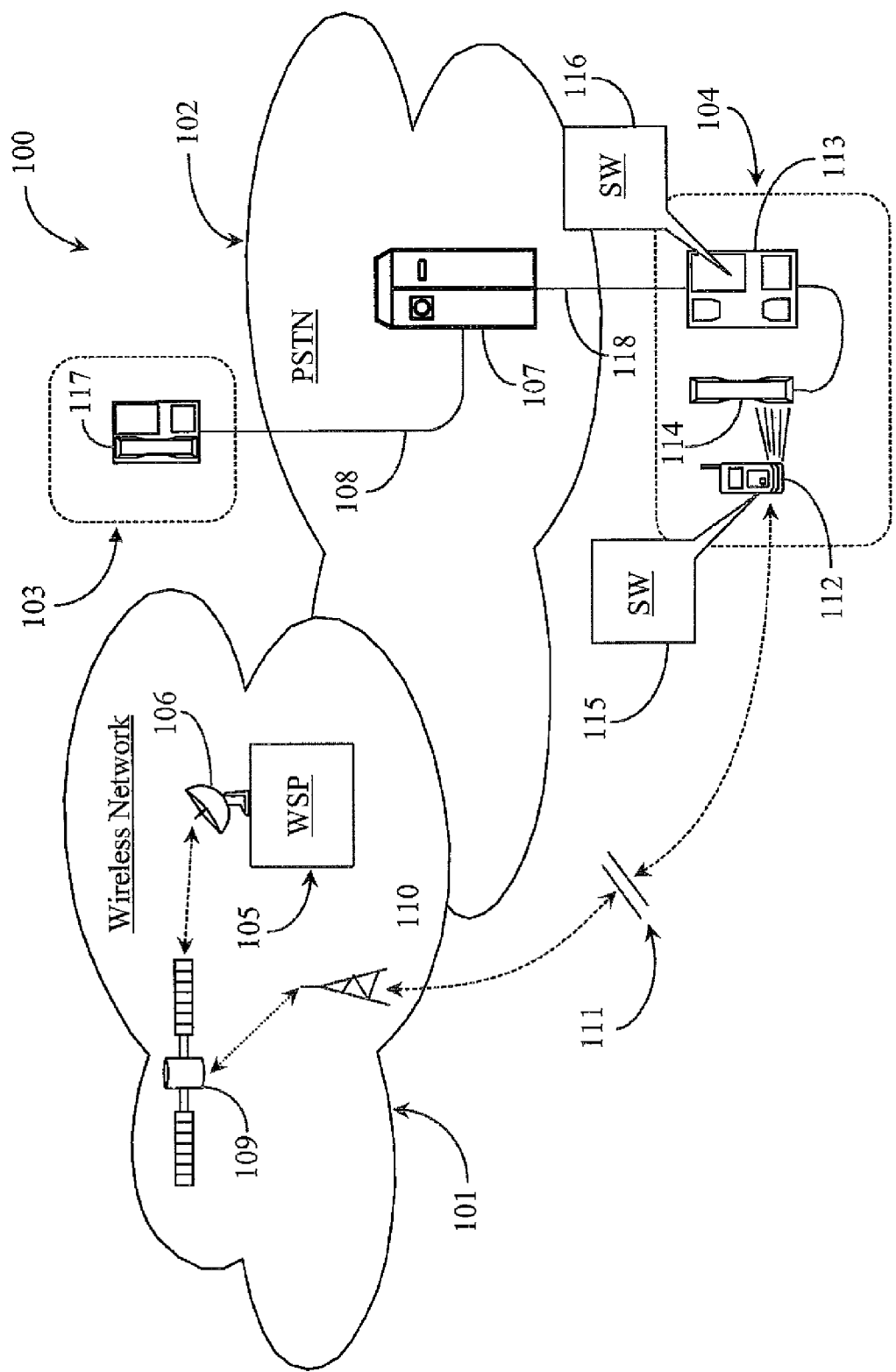
FIG. 1 is an architectural overview of a telephony network according to an embodiment of the present invention.

FIG. 1 is an architectural overview of a telephony network 100 according to an embodiment of the present invention. Network 100 represents a telephony communications network supporting practice of the present invention according to several different embodiments. In this example, communications network 100 includes a public switched telephone network (PSTN) telephone network 102, and a wireless telephone network 101. Communications network 100 may also be referred to herein as a telephony network 100 comprising one or more telephone networks.

PSTN network 102 may be a private telephone network rather than a public network without departing from the spirit and scope of the present invention. A reason for exemplifying the PSTN network is because of its high public access characteristics and the use of land lines and cables for carrying communications in a reliable manner. PSTN network 102 includes at least a local telephone switch 107 for purposes of discussion. Switch 107 may be an automated call distributor (ACD) switch or a private branch exchange (PBX) switch or some other type of telephone switch. The only requirement for switch 107 is that is capable of processing call requests and connecting parties to a telephone session.

A call destination premises 103 is illustrated in this example and includes a landline telephone 117 having connectivity and communications access to switch 107 in telephone network 102 by way of a telephone line 108. Premises 103 represents anyplace a call may be placed to where telephone 117 represents any destination telephone or telephony device. A call origination premise 104 is illustrated in this example and includes a landline telephone 113 having communications access to switch 107 in network 102 via a telephone line 118. Thus landline telephones 117 and 113 are wired to communicate with one another through PSTN 102.

Landline telephones 117 and 113 may be plain old telephony service (POTS) telephones with modern features or any variation of newer telephone models or appliances for voice communication like Internet Protocol (IP) telephones or base station handsets or head sets that communicate wirelessly with customer premises equipment (CPE), such as a base station for example. In this example telephones 117 and 113 are POTS telephones having at least limited programming capabilities such as a programmable dialer including normal telephone dialing and answering features.

Wireless network 101 may be a cellular telephone network including analog and digital capabilities that may include Internet access services over the digital wireless network. Wireless network includes a satellite transmitter/receiver 106 connected to a wireless service provider (WSP) premises 105. WSP 105 provides wireless telephone services and may be a known service company of which there are several. Network 101 includes a cellular relay tower 110 and relay satellite 109 representing typical equipment that might operate in a wireless network such as network 101.

A mobile telephone 112 is illustrated in this example in near proximity to landline telephone 113 in call origination premises 104. It is noted herein that designation of premises 104 as a calling premises is exemplary only. Any premises having a suitable telephone can be a call originating premises. Likewise, the designation of premises 103 as a destination premises is completely random. Any connected telephone may receive and send calls.

Wireless telephone 112 may be a cellular telephone, a personal digital assistant (PDA), or another network appliance capable of wireless telephony. In this example telephone 112 is enabled through a service subscription to a wireless telephone service such as one provided by WSP 105. In this example telephone 112 has communication access to network 101 but is not receiving a good wireless signal as is illustrated herein by a connectivity break 111 between cell tower 110 and telephone 112. Therefore, in this example it is possible that the caller receiving poor signal strength wants to use landline telephone 113 to place a call to an entity stored in the address book of mobile unit 112.

Typically speaking, there are no connection issues such as dropout, call fuzziness, or other such problems generally attributable to low signal strength in a landline telephone. Therefore a call placed to destination premises 103 such as to landline telephone 117 from landline telephone 113 would result in a more reliable communication session from the standpoint of quality of service (QoS) while a call placed to landline telephone 117 from mobile unit 112 might not even connect depending upon the current condition related to the wireless services.

Mobile telephone 112 has software (SW) or in some cases firmware 115 installed thereon and adapted to enable the telephone to play dual tone multi-frequency (DTMF) tones representing telephone number characters used to dial a telephone number. SW 115 enables the DTMF number string to be assembled and played through the speaker system of mobile 112 with speaker phone option set to on, among other capabilities. In a preferred embodiment the numbers to be dialed out are listed with other data as telephone address book entries in a displayable address book on phone 112. The numbers to dial may be selected from the telephone address book.

Landline telephone 113 has software (SW) or in some cases firmware 116 installed thereto in one embodiment of the present invention. SW 116 may be adapted to listen for a DTMF number dialing sequence played by telephone 112 with the aid of SW 115 using the telephone microphone, among other capabilities. Telephone 113 is illustrated in this example with a telephone handset 114 lifted off of the telephone and positioned to receive a DTMF signal via the speaker output of mobile telephone 112. The speaker mode of mobile telephone 112 may be adapted to turn on automatically when the DTMF dialing sequence initiates. Further, the volume of the DTMF signal generated is managed to be of sufficient magnitude to activate the dialing process in telephone 113. In the case of analog telephones there need not be a program to receive the input and to recognize it as a dial-out because the signal path will be open to the exchange. In the case of the digital device telephone using software, the input need not be DTMF, but could be any code that both software/firmware 115 and 116 understand and agree upon. SW 116 interprets the audible DTMF dial tones (or other code) as dialing intelligence or instruction and a command to dial the sequence out over the landline and make a connection to the number. In this aspect SW 116 may include a small program that sets the dialer of the origination telephone (113) to accept the recorded sequence as it normally does for a push-button dialing sequence.

In a simple embodiment a user operating mobile unit 112 under low signal-strength conditions decides to transfer a dialing operation to a nearby landline telephone such as telephone 113 in this example. The user may select or highlight an address book entry such as one representing the destination number assigned to telephone 117. The user may press "transfer dial" or "call" (in transfer mode) with the speaker of mobile 112 on and the handset 114 of telephone 113 lifted off of the receiver and positioned to pickup the sequence as it is played over the speaker system of the mobile. Landline telephone 113 automatically recognizes and executes dialing of the DTMF sequence representing the number selected and attempt to establish a call connection to telephone 117 over the PSTN network as would be the case if the telephone number was dialed manually from telephone 113. The user of mobile 112 may then use landline 113 to engage the called party in a telephone conversation.

The practice of the present invention does not necessarily hinge on low signal strength for mobile 112 as a reason to transfer dialing execution to landline 113. There may be a host of other reasons to use landline telephone 113 to dial and to connect with the called party such as a lower cost for the call, or simply that the user does not wish to manually dial the address book entry that is programmed on the mobile but not already part of an address list or book programmed into the landline telephone.

In this embodiment mobile unit 112, landline telephones 113 (execution) and 117 (destination), and telephone switch 107 for a routing system for routing a dialing instruction and establishing a telephone call based on the instruction.

Figure 2:
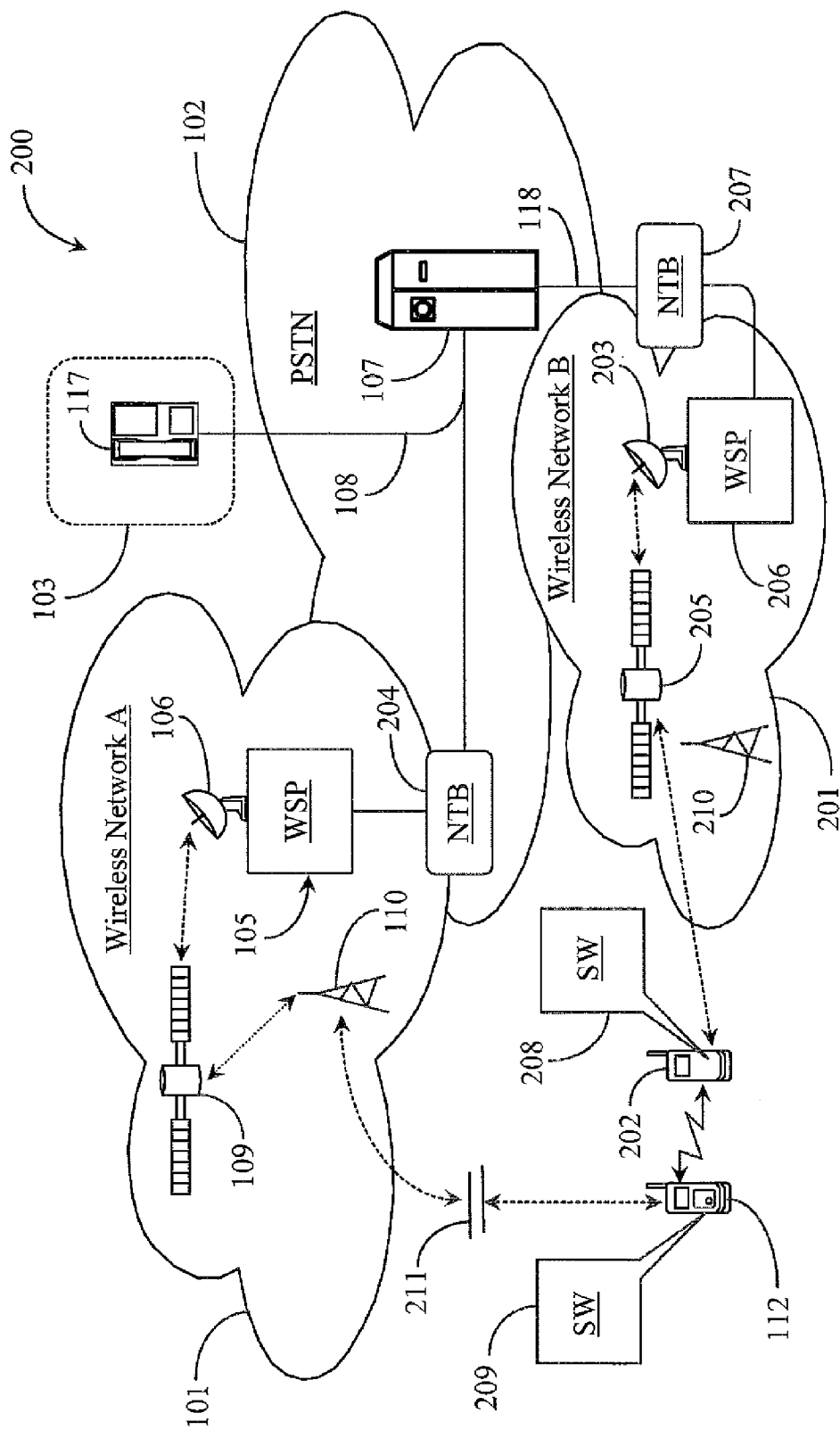
FIG. 2 is an architectural overview of a telephone system according to another embodiment of the present invention.

FIG. 2 is an architectural overview of a telephony network 200 according to another embodiment of the present invention. Network 200 represents a telephony communications network similar to network 100 incorporating the PSTN network of FIG. 1 and the wireless telephone network of FIG. 1. Many of the same communications components illustrated in FIG. 1 are also present in FIG. 2. Elements common to both examples will not be reintroduced. An additional wireless telephone network 201 is illustrated as a part of communications network 200. Wireless network 101 may be referred to herein as wireless network A and wireless network 201 may be referred to herein as wireless network B. Wireless networks A and B may refer to separate proprietary service networks A and B in this example, each network having its own WSP. In this example WSP 105 administers network traffic through network A and WSP 206 administers traffic over network B. Wireless network B (201) includes typical wireless communications components analogous to those described in FIG. 1 such as a satellite 205, WSP 206, satellite transceiver 203, and cell tower 210.

In this embodiment, wireless networks A (101) and B (201) are bridged for communication to PSTN network 102 through a network bridge (NTB) facility 204 and a NTB facility 207. NTB 204 and NTB 207 may be one of a number available bridging facilities adapted to extend wireless telephone calls into the PSTN network over the PSTN land lines. One with skill in the art of network bridging facilities will recognize that the appropriate telephone command protocol and call data conversion methods are well known and already in place for seamlessly transferring calls between networks in both directions.

WSP 105 has connection to NTB 204 and access to telephone switch 107 through the bridge. Likewise, WSP 206 has connection to NTB 207 and access to telephone switch 107 through the bridge. In this example mobile telephone 112 leverages wireless network 101 administered through WSP 105. A mobile telephone 202 is illustrated in this example and has connection to wireless network 201 through subscription to WSP 206. In this example mobile telephone 112 is not authorized to use network B and mobile 202 is not authorized to use network A. Logically speaking then the networks are separated according to proprietary services if not actual towers, satellites, and other equipment.

Mobile telephone 112 has software (SW) or firmware 209 installed thereon. SW 209 may be somewhat analogous to SW 115 of FIG. 1. Mobile telephone 202 has SW 208 or equivalent firmware installed thereon. SW 208 may also be somewhat analogous to SW 115 of FIG. 1. In this embodiment mobile 112 is receiving little or no signal strength from network A as illustrated logically herein by a service break or lull 211. On the other hand, mobile telephone 202 is receiving adequate or strong signal strength. The operator of mobile telephone 112 has decided to transfer a destination number dialing sequence and command to mobile telephone 202, which will actually dial the destination number and forge the connection.

In this example the transfer is made, not by playing a DTMF string, but by sending a number dialing sequence code and command instruction using a local wireless network capability like Bluetooth™ or an 802.xx wireless capability. In this case the motivation for transferring the dialing capability from phone 112 to phone 202 is low signal strength but that should not be construed as a limitation. If mobile 112 had good signal strength, there still may be motivating circumstances for transferring the dialing capabilities to mobile 202 such as lower connection and session costs in network B.

Mobile telephone 112 has an address book entry programmed therein that represents, for the purpose of discussion, the number and profile of the user operating telephone 117. It is noted herein that a destination address book entry may also be that of a mobile telephone or some other automated device capable of receiving a telephone session request without departing from the spirit and scope of the present invention.

A user operating mobile telephone 112 aided by SW 209 may first connect to mobile telephone 202 using Bluetooth™ or another available wireless protocol. The user may then select a phonebook entry and press dial while in a correct mode for transfer of the dialing instructions. Options such as "transfer dial" or "call transfer" may be provided so that the mobile telephone does not attempt to dial the selected entry. Mobile phone 112 aided by software 209 may produce the dialing code and embed the code in a message or command that is automatically sent as a dialing request including instruction to mobile phone 202 using the near proximity wireless protocol. Mobile phone 202 aided by SW 208 receives the message or command, parses it for the number dialing sequence, and automatically dials the telephone number. The call is placed through wireless network B, NTB 207, and switch 107 to the destination number such as to telephone 117.

Transferring the dialing intelligence and command from mobile 112 to mobile 202 is not limited to short-range wireless capability generic to those telephone sets. In one embodiment of the present invention a message like email or a short message service (SMS) message may be generated by mobile phone 112 for send to mobile phone 202. The message may contain the destination number dialing command instruction and code. In this aspect the signal strength to both mobile phones needs to be sufficient enough for SMS, instant messaging (IM), or email messaging. Motivation for transferring dialing execution from one mobile phone to another mobile phone may simply be the cost of the call.

In one embodiment motivation may simply consist of one person wanting to call a number that is not programmed in the phonebook on his or her mobile telephone so another person who has the contact listed in the phonebook on his or her mobile telephone simply selects the entry and presses a button to initiate the transfer of dialing intelligence so the second unit may dial the number. After the session, the user of the second mobile phone may save the number as a new contact in the phonebook on that phone, if desired.

Figure 3:
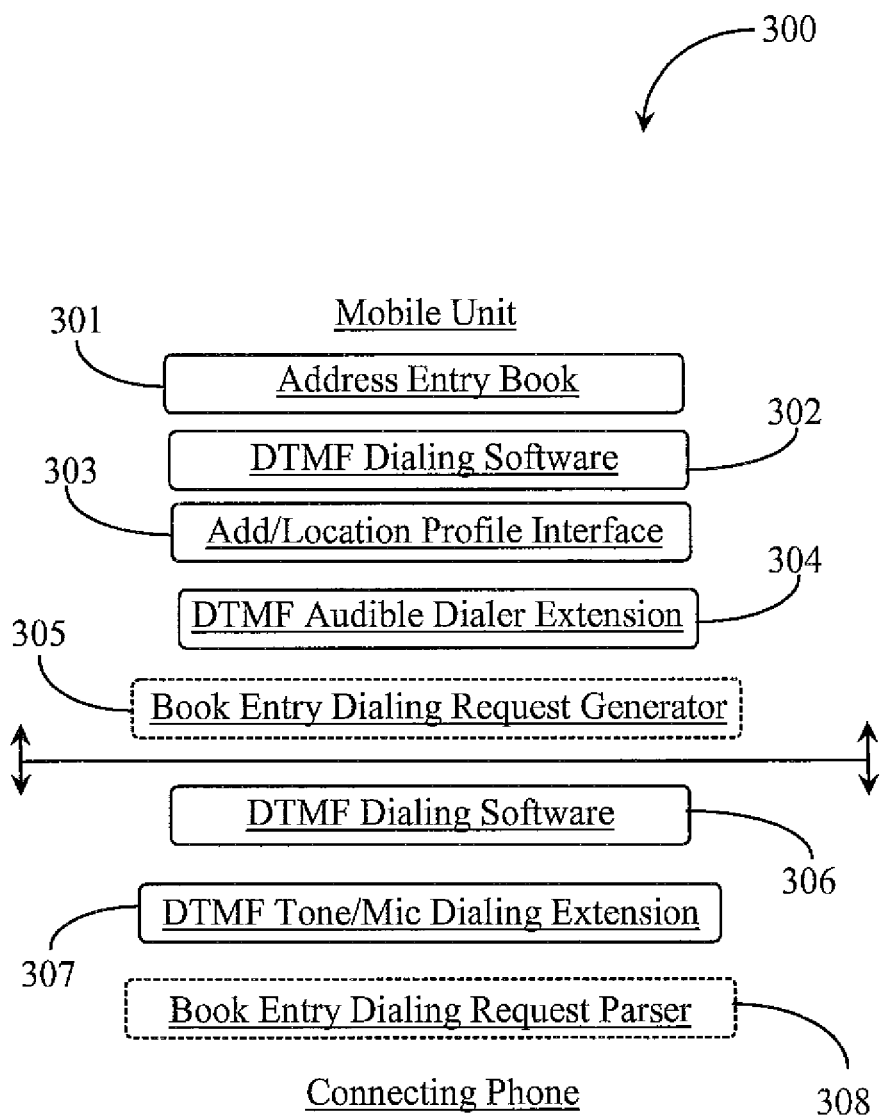
FIG. 3 is a block diagram illustrating software for enabling intelligent dialing transfer between two telephone units according to an embodiment of the present invention.

FIG. 3 is a block diagram illustrating components 300 for enabling intelligent dialing transfer between two telephone units according to an embodiment of the present invention. Referring now to FIG. 3, basic software SW components 300 are illustrated in block form. Components 300 comprise a program that may be installed partially on a mobile unit and partially on a landline telephone system including any connecting phone that actually dials the destination number. An address entry book 301 is generally required on the mobile phone that will transfer the dialing intelligence and command or request to dial to a connecting unit. The destination number at a minimum may be provided in a displayable list on the phone. DTMF dialing software 302 is provided at least in an embodiment wherein a DTMF dialing string is created and played over the phone speaker system as described further above with respect to FIG. 1.

In one embodiment where a DTMF dialer is used, an add location/profile interface 303 is provided. Interface 303 is used when a certain dialing profile is needed for the purpose of conforming to the dialing rules of the situation at hand. For example, to dial out from a hotel room in London for a tourist from the U.S., there may be several requirements to place the call. For example, the phonebook on the mobile phone may show a destination number for a call as 1+area code (309) followed by the telephone number 444 5555. The dialing instruction may be created as a profile for the hotel in London as follows. The profile name (location) may be "London" or the name of the hotel in London if it is a frequent location or one that the user often travels to when abroad. For the profile "Canterbury", for example, "use the following dialing instructions": Outside long distance line=72; Pause for line seizure=comma; Number of service provider=800 2345 678 Long pause for response=3 commas; Authorization code=123456; Pause for authorization=2 commas; International access code=00; Number=[1-309-444-5555].

Therefore, the number to dial according to the created location using the selected destination number is "72, 800 2345 678 , , , 123456 , , , 00 1 309 444 5555. Once the correct location profile is created, it may be used over and over with any destination number within the address book for the specified country. Other destination numbers of other countries can be automatically plugged into transferred dialing command intelligence and the connecting phone will automatically use the appropriate country access codes for those countries without having to create multiple dialing instructions for the one location.

If the user is at home in the U.S. then the profile can be "Home" and the connecting telephone will simply dial the number that is in the book or 444-5555 if the call is local and not a long distance destination number. If the service provider requires all of the digits to be dialed such as 1-309-444-5555, then the access and area code is automatically dialed. The entry should include the access code and area code if this is the case.

A DTMF audible dialer extension 304 is provided on the mobile phone in the DTMF embodiment and is adapted to enable the mobile telephone to dial the number using the DTMF dialing software without attempting to connect to the number. This feature may be likened to a "transfer dialing feature". The option may be provided as a static option visible in the displayed phonebook on the mobile telephone so that a user may select a destination number and then select "normal dial" or "transfer dial". Selecting the first option may simply dial the number and includes an attempt to connect to the destination party. The second option may cause the DTMF string to be played over the speaker system on the mobile phone so that the receiving phone responsible for dialing the number can incorporate the signal and actually dial the destination number and establish the connection with the aid of a telephone switch.

In an alternate embodiment where close proximity wireless messaging or typical service sponsored network messaging might be used to "transfer dial", then a book entry dialing request generator 305 may be provided as an extension to the mobile telephone phonebook or SW. The actual format and content of a generated request may vary somewhat with the type of technology used to convey the message whether close proximity messaging or network messaging. Close proximity messaging may include use of Bluetooth™ technology or some other available wireless tether like infrared, Wireless Fidelity (WiFi), or the like. Network messaging may include e-mail, IM, and SMS conventions or other like conventions that may be available to the inventor.

Components 300 may include a DTMF dialing software 306 installed on the connecting telephone that will record the DTMF string played over speaker system by the mobile unit and use it as dialing intelligence for a number dialing execution. A DTMF tone/microphone dialing extension 307 may be provided to set the phone to a mode for listening to the DTMF audible signals. Extension 307 is adapted to control the dialer whenever a correct DTMF sequence is recognized.

In an alternate embodiment wherein messaging is used to request a dialing sequence, a book entry dialing request parser 308 may be provided. Parser 308 may be adapted to recognize a message containing a dialing request and code for dialing the number. Once recognized, the parser interprets the intelligence and then initiates the dialing of the number.

Components 300 may include fewer or more components than were illustrated in this example without departing from the spirit and scope of the present invention. For example, Bluetooth™ or other close proximity wireless SW modules and extensions may be present. In some embodiments the connecting phone may be a mobile telephone and may therefore contain some or all of the mentioned components adapted for the mobile unit.

Figure 4:
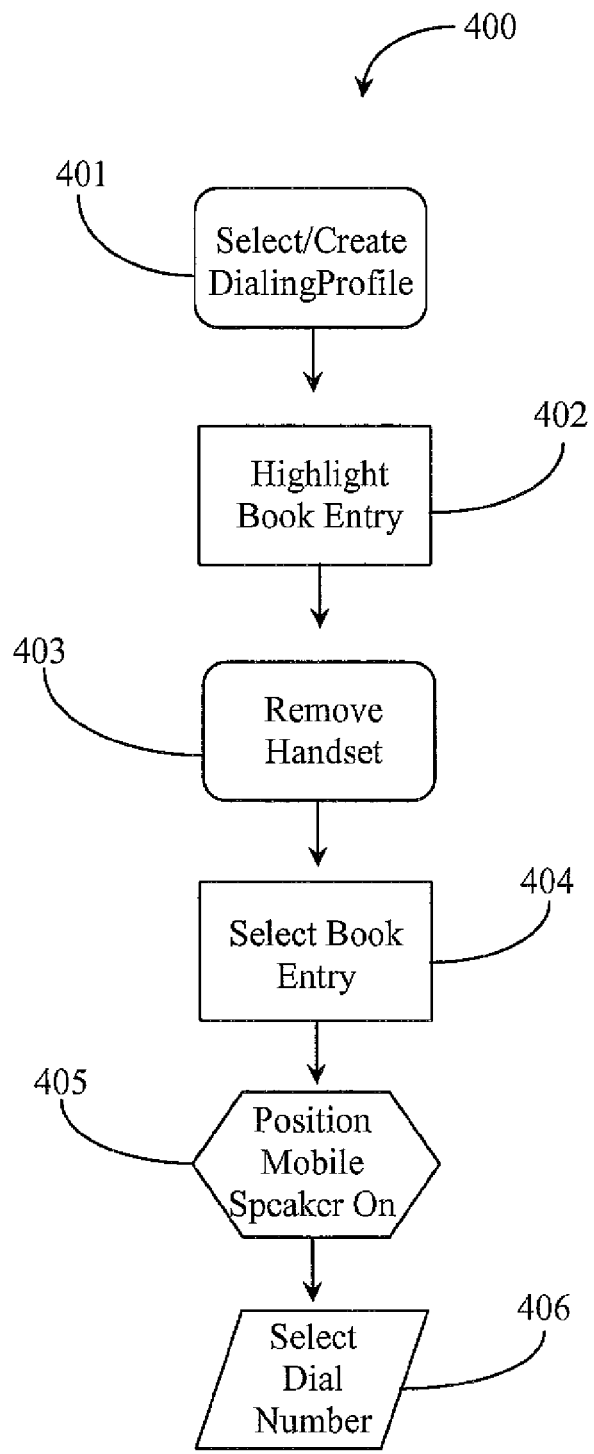
FIG. 4 is a process flow chart illustrating steps for executing a book entry from a mobile unit causing landline dialing execution according to an embodiment of the present invention.

FIG. 4 is a process flow chart illustrating steps 400 for executing a book entry from a mobile unit causing landline dialing execution according to an embodiment of the present invention. Referring now to FIG. 4, steps 400 are for transferring a dialing operation from a mobile unit to a landline telephone. In step 401 a user selects a dialing profile or creates one if an appropriate profile does not exist. The dialing profile may be created using an add location interface like interface 303 described above. The dialing profile is sensitive to the location of the actual call placed according to known dialing rules for that location.

In step 402 the user may highlight a phonebook entry containing minimally a dialable telephone number. In step 403 the user may remove the handset receiver of a landline telephone analogous to telephone 113 of FIG. 1 and position it to listing for a dialing sequence. In step 404 the user may select the appropriate telephone number to dial in a case where there is more than one telephone number such as by double clicking on the telephone number in the entry in some cases or by highlighting the exact telephone number. Many phonebook entries for one party contain multiple telephone numbers. In one embodiment where there is only one telephone number associated with an entry or a priority number (first number dialed) is acceptable, then step 404 may not be required.

In step 405 the user positions the mobile telephone with the speaker on next to the handset of the landline telephone so that the pending DTMF string can be picked up using the handset microphone. In step 406 the user may press a dial button or a "transfer dial" button if one is available. It is important that a feature for determining when or not an actual connection attempt is made or a dial transfer operation is made can be executed. One way to ensure that the mobile telephone will not attempt to connect to the destination party during a dial transfer operation is to provide a special button or mode for the operation. Another way to accomplish the correct operation on a generic mobile phone is to select the correct operation from available static options displayed and visible in the phonebook entry highlighted such as by selecting an option "Normal Dial" or by selecting an option "Dial Transfer" before depressing a generic call button on the phone.

In this embodiment, software on the landline telephone or generic DTMF capabilities built into the telephone enable the phone to record the DTMF signaling played through the speaker system of the mobile unit and to use the intelligence as a command to dial the number according to the provided number sequence and any dialing rules associated with the profile.

One with skill in the art will agree that the exact number and order of steps illustrated in this example may be changed without departing from the spirit and scope of the present invention. For example, in one embodiment an error message may play on the landline telephone in an event where the dialing rules or selected location profile is incorrectly selected or configured. It may be that some dialing rules need to be updated or that a user has inadvertently selected the wrong profile for the location of the call causing the wrong numbers to be dialed along with the destination telephone number.

Figure 5:
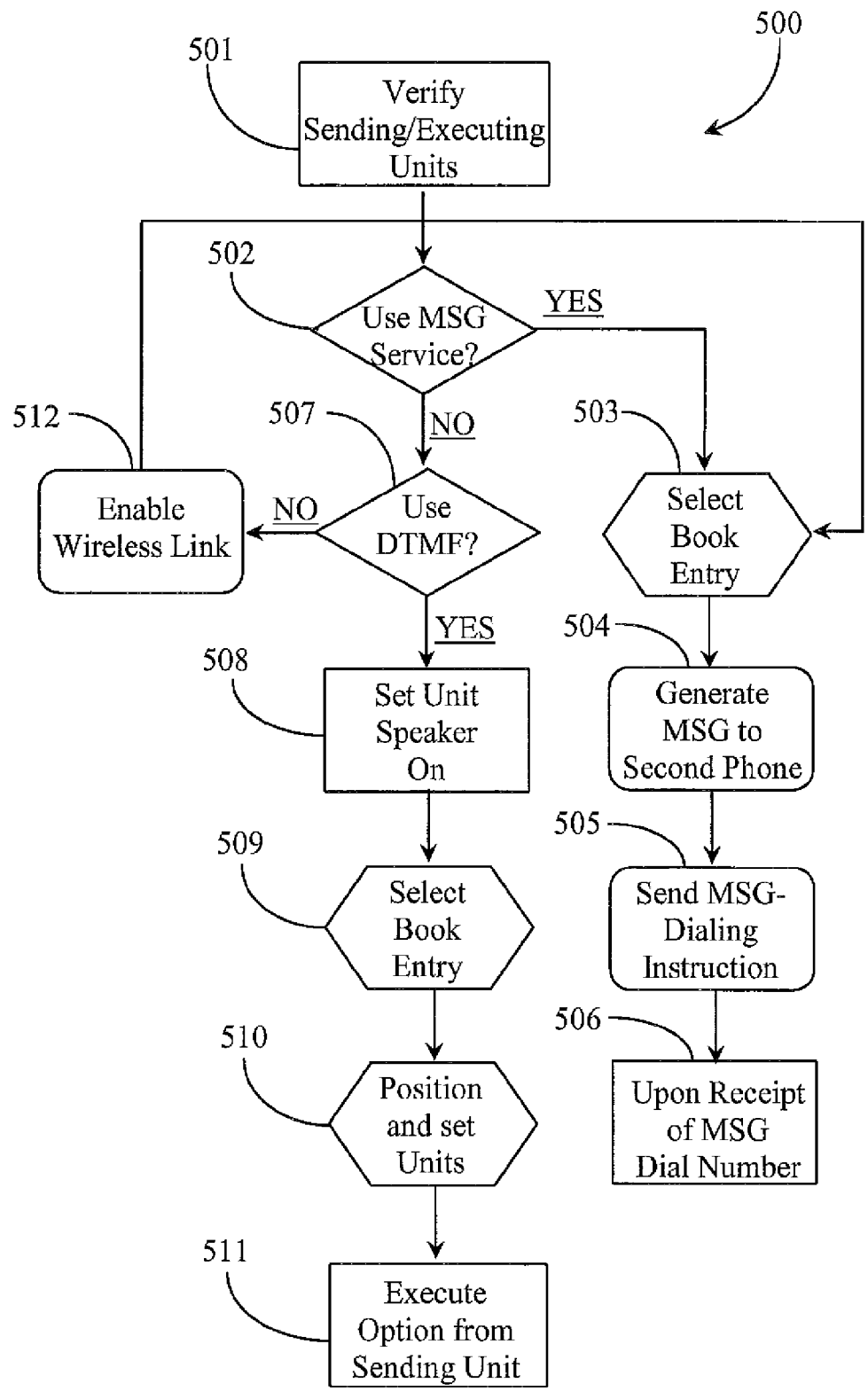
FIG. 5 is a process flow chart illustrating steps for requesting a dialing execution for a book entry of one mobile unit the number dialed by another mobile unit or capable landline unit.

FIG. 5 is a process flow chart illustrating steps 500 for requesting a dialing execution for a book entry of one unit the number dialed by another unit. Steps 500 are provided to illustrate dial transfer options depending on included capabilities and scenarios including whether or not messaging or DTMF signaling is used in the transfer operation. At step 501 a user may verify that a sending unit and an executing or dialing unit is available to practice a dial transfer operation. A sending unit is typically a mobile telephone but may be any other device capable of practicing telephony. An executing unit is typically a landline telephone but may be a mobile device with good wireless reception. The term unit will be used in this description to refer to a telephony device mobile or not that is adapted to practice the invention.

At step 502 the user may decide if a messaging service will be used to initiate the dial transfer operation. If in step 502 the user decides that a messaging service will be used, the user may select a phonebook entry containing minimally one telephone number to dial at step 503. In this example it is assumed that all of the proper dialing rules are made available through a location profile or otherwise known to the dialing unit. The user may be required to select a telephone number to dial from more than one available telephone number displayed in the phonebook entry on the sending unit. It is noted herein that both the sending and executing units must be capable of practicing the network-based messaging determined for carrying the transfer of instructions. Both units must also be connected to the network hosting the messaging service to enable send and receipt of messages.

In step 504, the user may generate a message (MSG) addressed to the second telephone or dialing unit. The second telephone may also be a mobile telephone. The message type may be an email message, an instant message, or a short message service (SMS) message. The carrier network may be the Internet network including any connected sub-networks.

At step 505 the user may send the message generated at step 504. The message may contain the dialing instruction, number to be dialed, and code to the dialing unit. At step 506 the dialing unit may receive the message and may dial the number according to the message data, which includes any instruction in addition to the exact telephone number to dial. A feature may be available in the mobile phonebook that enables the user to select a "Normal Dial" or to select a "Dial Transfer" operation so that if the "Dial Transfer" option is selected, the message is automatically generated except for the addressing of the message to the receiving unit that will actually dial the number. The address of the receiving unit may be a telephone number, an IM handle or an email address.

In step 506, the receiving unit recognizes and accepts the message parses the instructions and dials the number according to the message parameters. The participating units may be mobile telephones using one or more than one wireless service. The executing unit might be a landline unit that is enabled for messaging.

Referring back to step 502 if the user decides not to use a messaging service, then the user may decide if DTMF signaling will be used at step 507. FIG. 4 illustrates steps used for dial transfer to a landline telephone. It may be assumed in this example that the sending unit is another mobile telephone or a landline unit capable of messaging and/or short-range wireless communication. A mobile dialing unit may be adapted to recognize DTMF tones and may serve as the executing unit. If at step 507 the user decides to use DTMF signaling, the user may set the speaker phone on the sending unit to on at step 508. At step 509 the user may select a phonebook entry that contains at least one telephone number to dial at minimum. In case of more than one listed telephone number, the user may select a correct or preferred number. Also in this step, the user may select an option "Dial Transfer" or an equivalent option so that the sending unit does not attempt to connect with the destination number.

The user may position the sending unit near the dialing unit once the sending unit is set to transfer a dialing operation. The user may set the dialing (executing) unit to receive the DTMF signaling by lifting the phone receiver or flip-top lid (if mobile) or otherwise activating the microphone on the unit as part of step 510. This step may be undertaken before the phonebook entry number is selected for dial transfer at step 509. At step 511 the user may depress a dial button or equivalent on the sending unit to initiate the transfer. The DTMF dialing string will be played over the speaker and will be picked up by the microphone of the dialing unit, which will automatically dial the number and attempt connection to the destination party.

The user may decide not to use DTMF referring back to step 507. A third option exists if the units can communicate with each other via Bluetooth™ or some other close proximity wireless protocol. If at step 507 the user has decided not to use DTMF after also deciding not to use a messaging service in step 502, the user may enable a wireless link between the units involved at step 512 for the purpose of sending a message to initiate the dial transfer operation. In this case, the process resolves back to step 503 through step 506 using generally the same sequence used if a messaging service is selected. The only difference is that the message passes directly from mobile to mobile and the units do not have to be connected to a network supporting messaging.

One with skill in the art will agree that the exact number and order of steps required to practice the illustrated options may vary somewhat without departing from the spirit and scope of the present invention. For example, a user may decide whether to use DTMF before deciding whether to use a messaging service or whether to use a wireless link to initiate a dial transfer operation. The use of DTMF signaling in this example assumes that both units (sending and executing) are adapted for the purpose with the aid of the software of the present invention or its equivalent in firmware.

Figure 6:
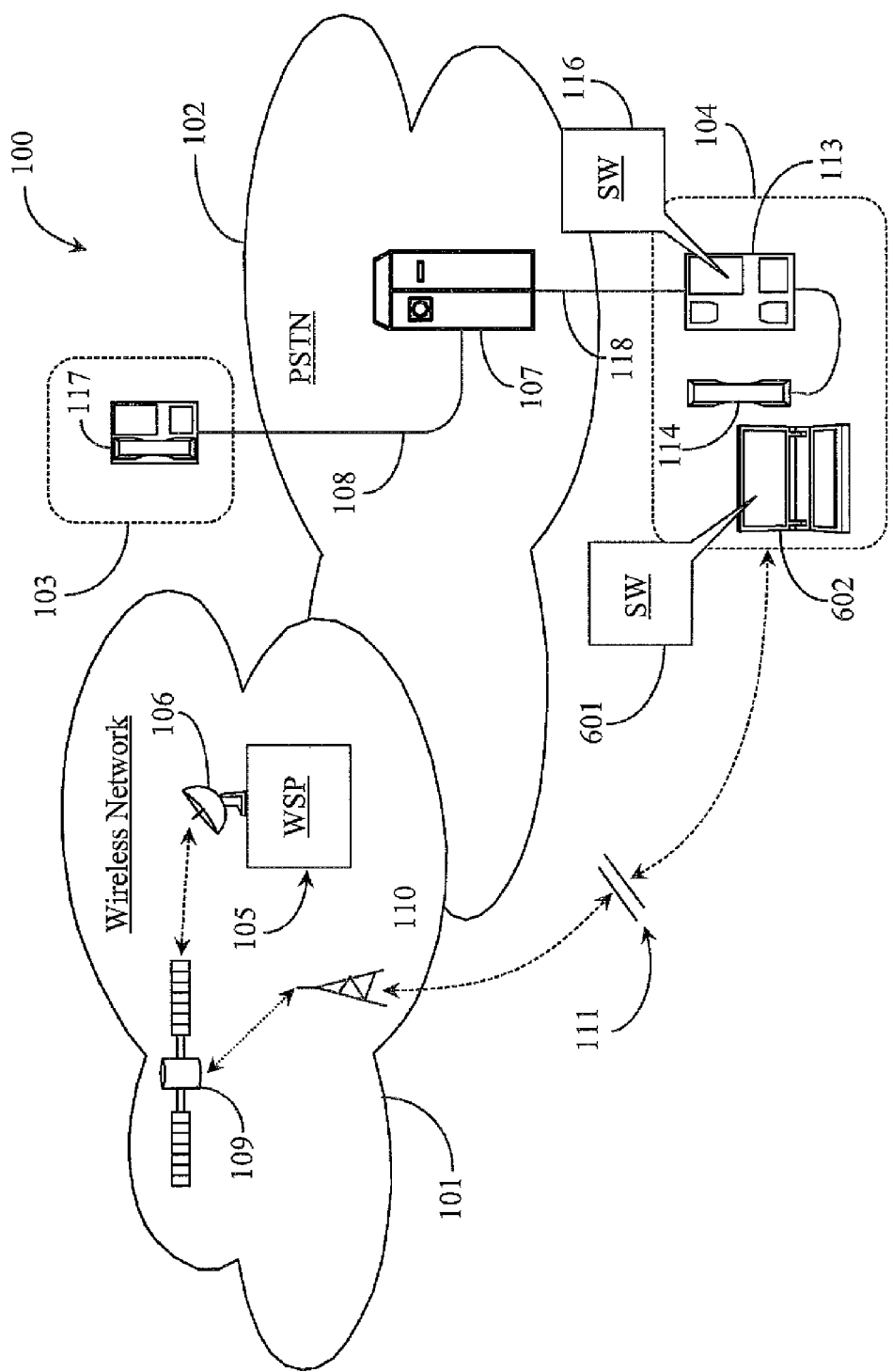
FIG. 6 is an architectural overview of a telephone system accepting dialing intelligence from a mobile laptop computer according to an embodiment of the present invention.

FIG. 6 is an architectural overview of telephone network 100 supporting receipt of dialing intelligence from a mobile laptop computer during a dialing transfer operation according to an embodiment of the present invention. Referring now to FIG. 6, network architecture identical to that of FIG. 1 is illustrated. Many of the same components illustrated and described in FIG. 1 are also illustrated in this example and therefore shall retain the same element numbers and shall not be reintroduced. In place of mobile unit 112 described with respect to FIG. 1 further above, a laptop computer 602 is illustrated. Laptop 602 has a wireless connection to wireless network 101. Laptop computer 602 has SW 601 installed thereon for practicing the present invention using an address book on the laptop and PC dialing software, typically dialing out through a software modem or wireless network card. SW 601 may be similar to SW 115 described in FIG. 1 accept that it is adapted for a PC instead of a mobile telephone.

Laptop 602 may be wirelessly connected to any wired or wireless network including LAN, WAN, or WiFi networks without affecting DTMF dialing function. Laptop 602 may dial out a selected telephone book entry number without attempting to connect to the party of the number by properly setting previously mentioned features in the phonebook display such as "Normal Dial", or Transfer Dial" as is the case with a mobile telephone. Messaging services and close proximity messaging may also be used with the laptop if it is enabled for those technologies. However in this example, telephone 113 may be a POTS telephone and therefore may not be able to accept electronic messages. Therefore DTMF transfer may be an only option in this particular example. The process for initiating a dial transfer using DTMF signaling from laptop 602 to telephone 113 is the same as that process illustrated in FIG. 4. Telephone unit 113 may be a telephone that has messaging capabilities including wireless short range communication capabilities like Bluetooth™. In one embodiment unit 113 may be a desktop or laptop PC connected to the Internet and enabled for dial-out telephony. There are many unit configurations possible.

It will be apparent to one with skill in the art that the methods and apparatus of the invention for enabling a dial transfer operation from a mobile telephone to a telephone dialer (landline or mobile) may be provided using some or all of the mentioned features and components without departing from the spirit and scope of the present invention. It will also be apparent to the skilled artisan that the embodiments described above are exemplary of inventions that may have far greater scope than any of the singular descriptions. There may be many alterations made in the descriptions without departing from the spirit and scope of the present invention.

What is claimed is:

1. A system for placing a telephone call, comprising:
a first digital mobile telephone having a speaker, an audible code generator enabled to generate a specific sequence of audible tones, and first software executing from a non-transitory medium, the software associating telephone numbers with the specific sequences of audible tones;
a second digital telephone having a microphone, and executing second software from a non-transitory medium; and
a dialer provided by the second software, integrated with the microphone and operable on the second digital telephone, the dialer capturing the sequence of audible tones, and associating the sequence with the telephone number;
wherein a telephone number is selected or entered on the first digital mobile telephone, the first digital mobile telephone generates the associated sequence of audible tones for the telephone number over the speaker, the sequence of audible tones is captured by the microphone of the second digital telephone, and the second digital telephone places the telephone call.

2. The system of claim 1 wherein the telephone number is associated with a contact in the first digital mobile telephone, and is accessed by selecting a contact from a contact list stored on the first digital mobile telephone.

3. The system of claim 1 wherein the telephone number is entered on a keypad of the first digital mobile telephone.

4. The system of claim 1 wherein the sequence of audible tones is according to Duel Tone Multiple Frequency (DTMF) protocol.

5. A method for placing a telephone call, comprising the steps:
(a) selecting or entering a telephone number on a first digital mobile telephone having a speaker, an audible code generator enabled to generate a specific sequence of audible tones, and first software executing from a non-transitory medium, the software associating telephone numbers with the specific sequences of audible tones;

(b) generating a sequence of audible tones uniquely associated with the telephone number over the speaker of the first digital mobile telephone;
(c) receiving the sequence of audible tones at a microphone of a second digital telephone having a microphone, the second digital telephone executing second software from a non-transitory medium;
(d) associating the sequence of audio tones received with a telephone number by the second software executing in the second digital telephone; and
(e) dialing the telephone number by the second digital telephone.

6. The method of claim 5 wherein the telephone number is associated with a contact in the first telephone, and is accessed by selecting a contact from a contact list stored on the first digital mobile telephone.

7. The method of claim 5 wherein the telephone number is entered on a keypad of the first digital mobile telephone.

8. The method of claim 5 wherein the sequence of audible tones is according to Duel Tone Multiple Frequency (DTMF) protocol.

* * * * *